Nov. 21, 1972 — G. W. SMITH — 3,703,462
SEWAGE TREATMENT APPARATUS AND METHOD
Filed Jan. 6, 1971 — 3 Sheets-Sheet 1
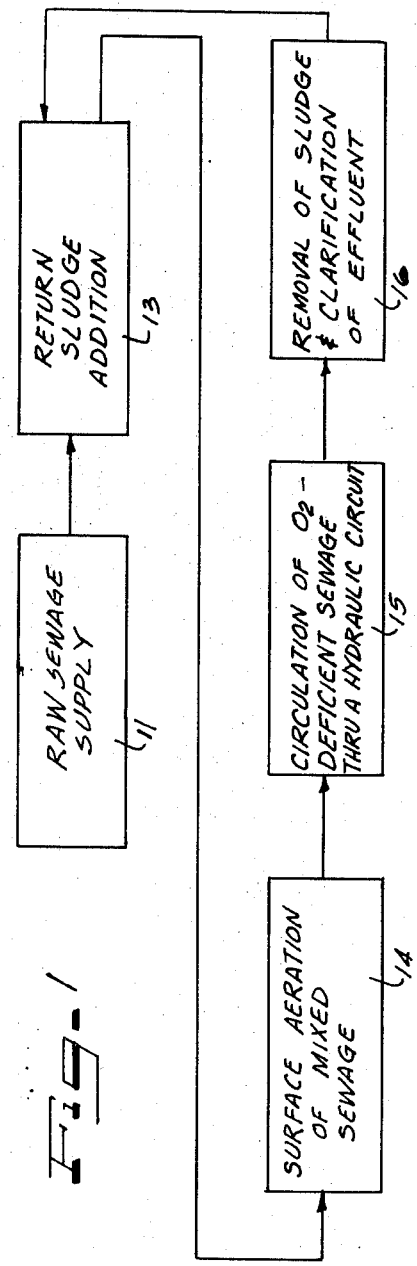
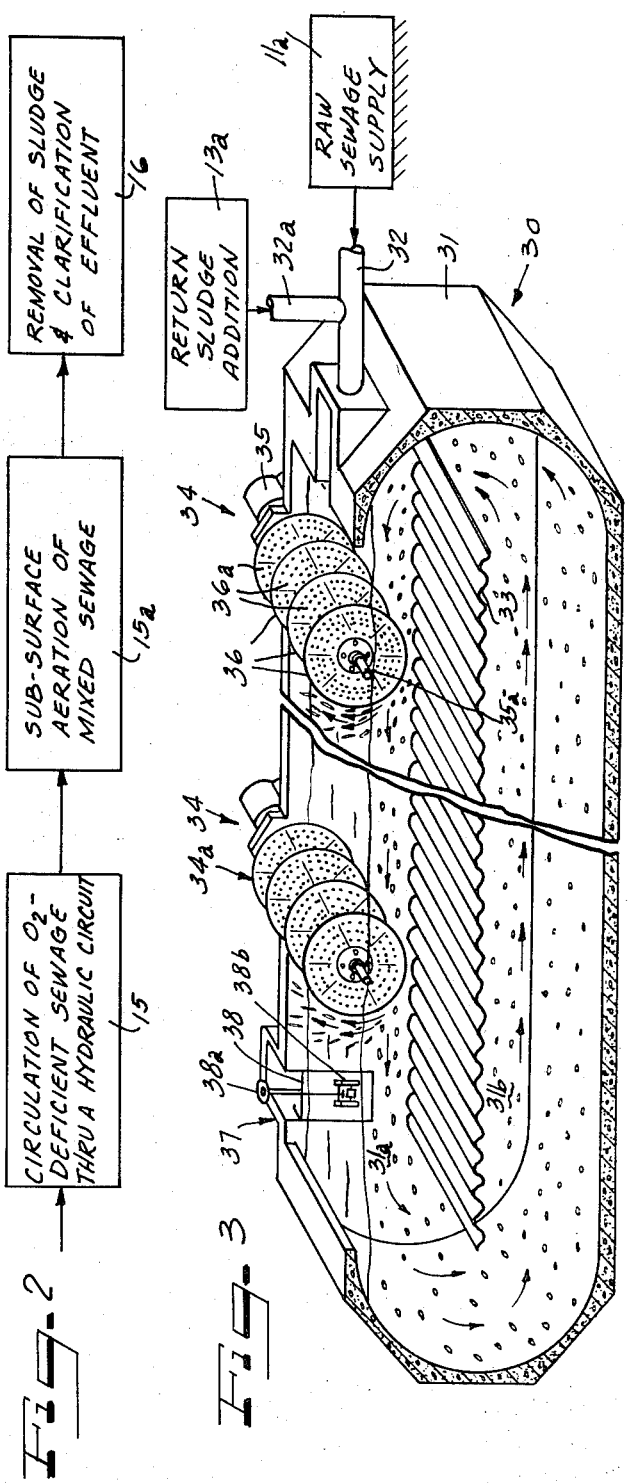
INVENTOR.
GEORGE W. SMITH
BY ATTORNEYS

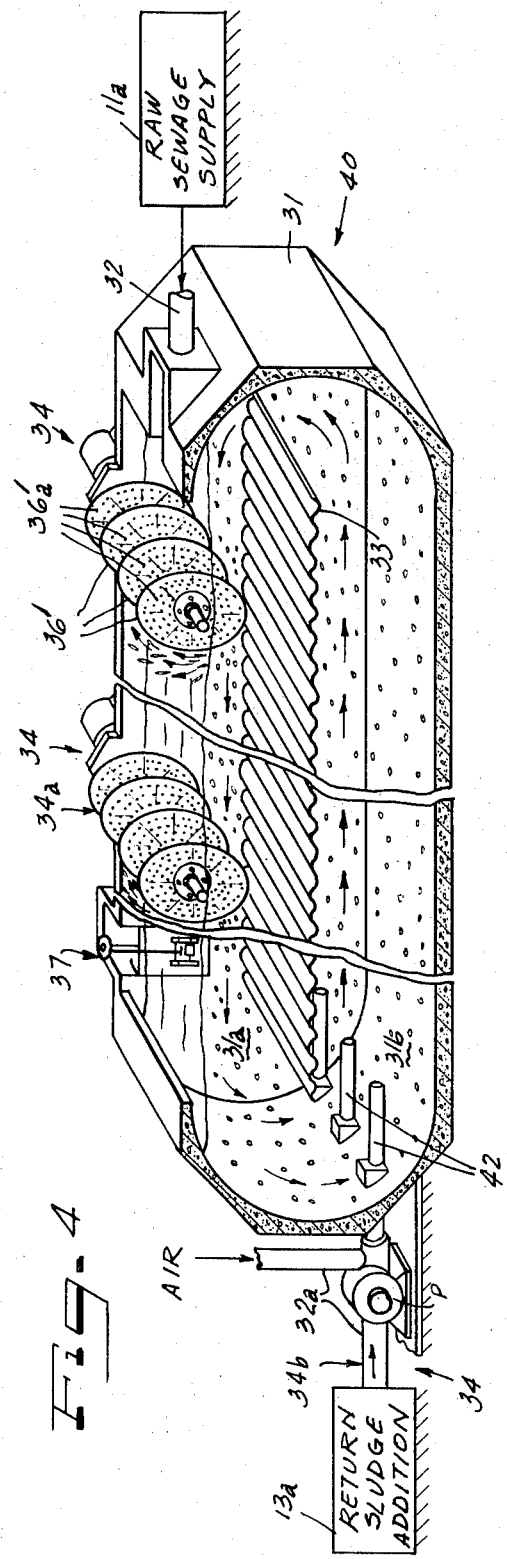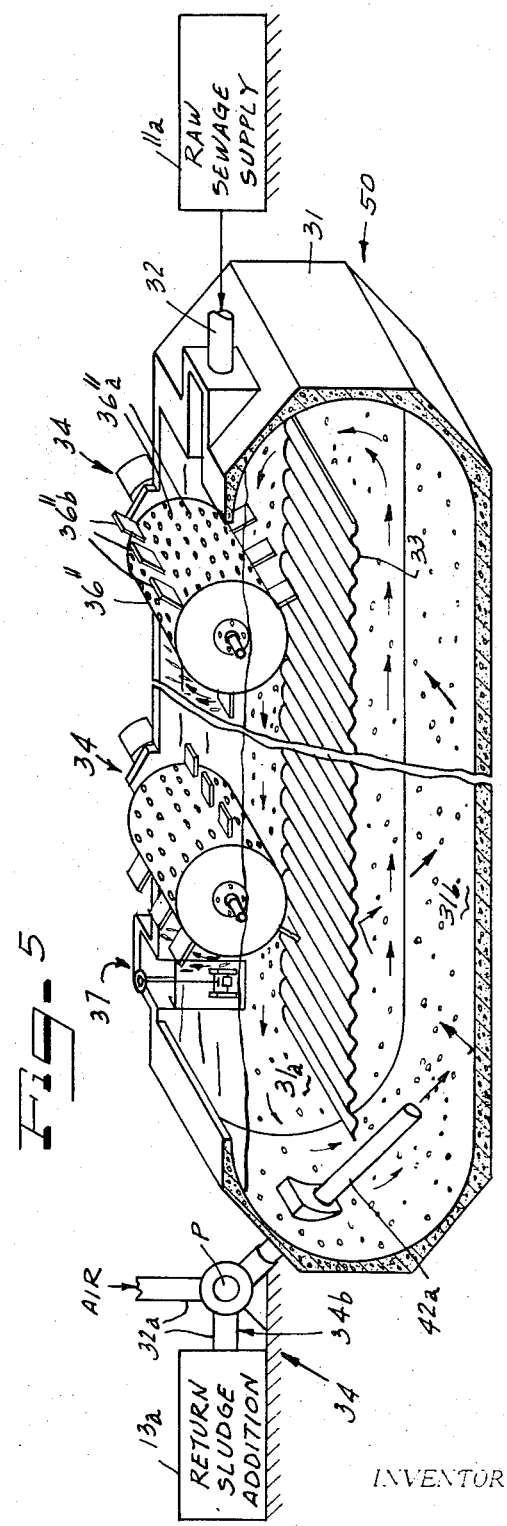

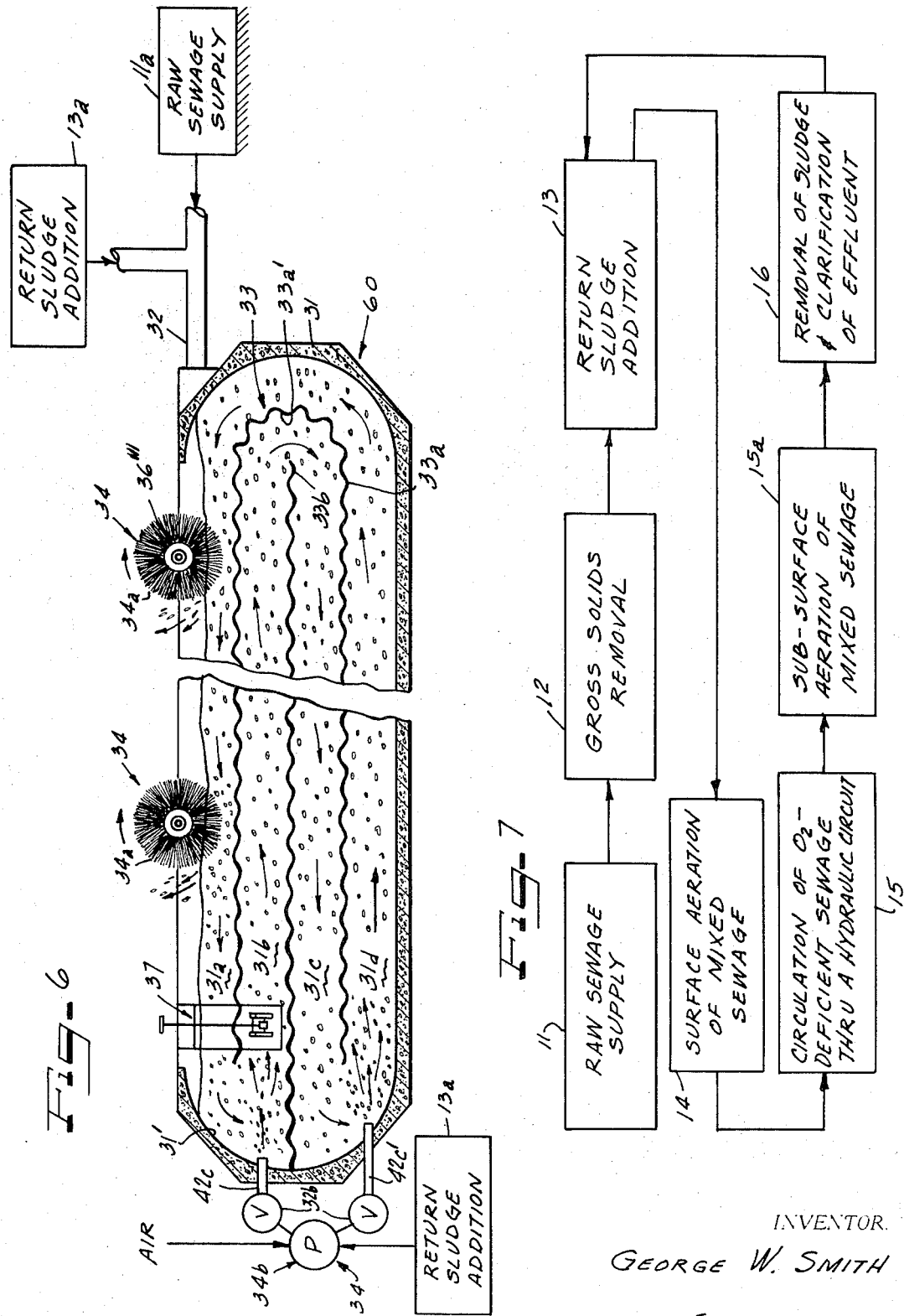

United States Patent Office 3,703,462
Patented Nov. 21, 1972

3,703,462
SEWAGE TREATMENT APPARATUS
AND METHOD
George W. Smith, 2639 W. 32nd Place,
Chicago, Ill. 60609
Filed Jan. 6, 1971, Ser. No. 104,360
Int. Cl. C02c 1/10
U.S. Cl. 210—7
11 Claims

ABSTRACT OF THE DISCLOSURE

A method and apparatus for use in an activated sludge process of treating waste water wherein raw sewage or the like is mixed with return (activated) sludge and the so-mixed sewage liquor is confined in a tank and subjected to aeration (with or without additional sub-surface aeration) whereby air is co-mingled with the sewage liquor and circulated therein in a predetermined vertical flow pattern through a plurality of flow passageways within the tank so that air is confined within the waste water for a substantial portion of the overall waste water flow circuit. After a period of time, the treated sewage liquor is removed from the tank, the sludge removed for recycle or ultimate disposal and the effluent water clarified and otherwise treated.

BACKGROUND OF THE INVENTION

Field of the invention

The invention relates to waste water treatment and more particularly to an improved activated sludge treatment of waste water.

Prior art

Activated sludge treatment of waste water (sewage) is known. Generally, waste water is directed into a shallow confined area, such as a tank or a ditch, having a relatively large surface area exposed to air and the waste water (with or without return sludge added thereto) is co-mingled with air for a period of time so that oxygen is dissolved therein and supplied to the biological organisms within the waste water. Certain of such known processes utilize aeration mechanisms, such as brushes, disks, hollow rolls, etc. in an attempt to obtain sufficient air to liquid contact and to provide sufficient agitation to keep waste solids suspended within the liquids thereof. The efficiency of such devices, generally expressed as pounds of dissolved oxygen per horsepower per hour, leaves much to be desired. Additionally, the prior art requirement for shallow confining areas with large air-exposed surface areas detracts from the economy of such systems and does not allow such systems to be utilized in areas where land is scarce.

The instant invention provides a method and apparatus for use in activated sludge process which overcomes these and additional drawbacks and provides an improved method and apparatus for use in an activated sludge process of treating waste waters.

SUMMARY OF THE INVENTION

The invention generally provides a method and apparatus for use in an activated sludge process for treating waste water whereby the contact between air and the liquid is greatly increased and the amount of exposed surface is confining areas, such as tanks, is greatly reduced as compared to prior art techniques. More specifically, the invention comprises circulating a sewage liquor-air mixture (referred to as a complete mix system) through a hydraulic vertical flow circuit in a manner preventing the escape of substantial amounts of air from such mixture for a major portion of the flow circuit whereby increased efficiency is attained.

A preferred embodiment of the apparatus comprises a generally rectangular tank of considerable depth having baffle-like members positioned below the normal liquid surface thereof so as to define a plurality of flow passageways therein with various aeration mechanisms positioned in one or more of such passageways introducing air and flow energy to the waste water within such apparatus. The baffle-like members prevent air within the passageways from escaping and allows an increased amount of oxygen to be supplied to the biological organisms therein in an extremely efficient manner which materially reduces the overall cost of utilizing such a system.

BRIEF DESCRIPTION OF THE DRAWINGS

FIG. 1 is a diagrammatical showing of a preferred embodiment of the method of the invention;

FIG. 2 is a partial diagrammatic showing of a modified embodiment of the method of the invention;

FIG. 3 is a somewhat diagrammatic side elevational view, partially broken away, illustrating an embodiment of the apparatus constructed and operating in accordance with the principle of the invention;

FIG. 4 is a somewhat similar view of another embodiment of the apparatus of the invention;

FIG. 5 is a somewhat similar view of yet another embodiment of the apparatus of the invention;

FIG. 6 is a somewhat similar view of yet another embodiment of the apparatus of the invention; and FIG. 7 is a diagrammatical showing of yet another embodiment of the method of the invention.

DESCRIPTION OF THE PREFERRED EMBODIMENTS

The invention provides, in some of its most general aspects, a treatment of waste water, such as sewage, whereby a volume of waste water is confined within a relatively deep confining means, such as a tank or the like, which is provided with horizontally disposed, gas-impermeable baffle means that are substantially coextensive with the confining means and spaced from the ends thereof so as to provide flow passages between the baffle means and the ends of the confining means. The baffle means are positioned within the confining means and at least below the normal liquid level therein. The confining means and the baffle means are so arranged as to define a plurality of serially interconnecting passageways that establish an elongated endless vertical flow circuit for providing complete mix of sewage matter within the confining means, and without the intermixed air escaping. Mechanical aeration devices positioned within one or more of such passageways introduce air bubbles into the confined waste water and impart a predetermined flow energy thereto throughout the flow passageways. The invention provides an increased contact between the air bubbles and the waste liquids, so as to allow a greater amount of oxygen to be dissolved therein and materially improving the overall efficiency of such a system.

As shown in FIG. 1, raw sewage or other waste liquid is passed from a supply 11 thereof to a return or activated sludge source 13 (such as recycled from a clarifier means 16) and a predetermined amount of such return sludge is intermixed therewith to produce a mixed sewage liquor. The mixed sewage is then aerated, as by an aeration means 14, so that air bubbles or the like are introduced into the sewage along the upper portion or layer thereof. The sewage-air mixture is then hydraulically circulated by a means 15 through a vertically endless orbital flow pattern wherein a majority of the air within the sewage liquor is prevented from escaping for a substantial portion of such circuit. In this manner, an increased amount of oxygen dissolves within the sewage and is readily available to the various biological organisms in the amounts necessary for the efficient treatment of sewage.

Sewage solids do not have to be removed from the raw sewage prior to the above treatment and, if desired, are allowed to remain therein and treated as described. As will be appreciated, additional flow energy may become necessary to maintain suspension of the solids throughout the flow circuit.

The efficiency of this process is materially increased from that available by prior art techniques since the horespower requirements for the aeration mechanism is similar or lower than that required by prior art and additionally, air remains in contact with the liquid for substantially longer periods of time than in prior art techniques thereby providing more oxygen to the biological organisms for conversion of sewage into sludge. In this regard, it might be pointed out that most prior art processes provide, at most, about 3 pounds of oxygen per horsepower per hour whereas a process of the invention provides about 5 or more pounds of oxygen per horsepower per hour. This is a significant increase in efficiency and materially improves the economy of the invention. The circulation of the sewage-air mixture is continued for a period of time sufficient to treat at least a substantial portion of the raw sewage and then the treated sewage is removed from the confining area or tank and passed to a clarification means 16 whereat sludge is removed for recycling to the raw sewage as shown or is otherwise disposed of, and the effluent is clarified and otherwise treated to yield useful water.

In a modified process of the invention, such as shown at FIG. 2, the sewage is passed through the various steps as outlined in the above discussion and, after the sewage-air mixture is circulated by a means 15 through a hydraulic circuit, additional air and flow energy is introduced at sub-surface levels by means of a sub-surface aeration means 15a. The sub-surface aeration means 15a provides an additional amount of air to the sewage liquor and provides additional energy to the liquid flow to insure adequate suspension of solid and for further increasing the efficiency of the overall process.

As shown at FIG. 3, the invention includes an apparatus embodiment 30, such as confining tank or the like 31 composed of a suitable material, such as concrete, synthetic resin, steel, etc. The tank 31 is generally of a rectangular shape and of any desired size to hold a desired volume of liquid, the major or longer axis of such tank can vary in length up to about 100 or 200 feet while the minor or shorter axis can vary in depth up to about 50 or 100 feet. In one preferred embodiment, the tank 31 is constructed so as to have a liquid depth of about 8 to 12 feet and a length of about 16 to 30 feet. The tank 31 is provided with a fluid inlet passageway 32 which is connected in an operational manner to a raw sewage supply 11a and to a return sludge addition means 13a. The raw sewage (with or without gross solid removal) and the return sludge (and/or partially treated sewage liquor) are intermixed with each other within the passageway 32 prior to entering tank 31.

A baffle-like means 33 is mounted within the tank below the normal liquid level thereof approximately dividing the interior of the tank 31 into a plurality of equal volume flow passageways 31a and 31b. As will be appreciated, while only two such flow passageways are shown, an additional number of such flow passageways can be provided, if desired, such as shown at FIG. 6. The baffle-like means 33 is mounted along portions of the tank, such as at the sides of the tank, so that liquid and the like can only flow around the ends thereof in a predetermined hydraulic circuit, such as a vertical orbital circuit having a flow portion along its major axis of a greater dimension than that of the flow portion along its minor axis. The baffle-like member 33 is gas-impermeable and may be composed of, for example, a suitable synthetic resin, a suitable metal, etc. and may be formed in corrugated fashion, such as shown, or otherwise, to provide increased strength characteristics and to insure that the entrapped air does not merely form a large film or bubble along the underside surface thereof.

Aeration means 34 are mounted within at least one of the flow passagaways within the interior of the tank 31. A surface aeration means 34a is mounted along the upper surface of tank 31 within the upper flow passageway 31a. The aeration means 34 may take a plurality of forms, including the surface aeration device 34a as shown at FIG. 1, which generally comprises a plurality of disks 36 mounted on a common axle 35a for rotation across the width of the flow passageway 31a so as to be at least partially in contact with the sewage liquor in passageway 31a. The axle 35a is operationally connected to a drive means 35, such as an electrical motor. The discs 36 are provided with a plurality, i.e. thousands, of fine perforations 36a therethrough which function to not only carry air bubbles into and below the surface of the sewage liquor within flow passageway 31a but to also trap sub-surface liquid therein and carry drops thereof upwardly into contact with ambient air. As shown, a plurality of aeration means 34 may be provided, and the speed of rotation regulated as desired. The aeration means 34 thus generally functions to introduce air below the liquid surface and provides flow energy or surface agitation to the sewage liquors sufficient to prevent waste solids from settling out.

Mixed sewage (i.e., raw sewage and return sludge) flowing into the tank 31 is immediately mixed with the contents within the tank, if any, and with air by means of the aeration means 34. The aeration means 34 function generally in a plane parallel to the direction of flow and introduce air and flow energy into the mixed sewage. Thus, when the discs 36 revolve at a predetermined speed, the perforations 36a therein trap air from above the liquid surface and, in response to liquid pressure, release the air under the liquid surface as fine bubbles. The perforations 36a also aerate by bringing sub-surface liquid, whose dissolved oxygen content is less than that of the liquid which is near or at the surface, upwardly and released this liquid, in the form of droplets or the like, above the liquid surface for increased contact with air. The revolving discs 36 also deliver energy to the confined sewage liquors so as to establish directional flow and provide an adequate channel velocity necessary to maintain the waste solids within the liquids and prevent the same from merely settling out.

This directional flow, aided by the geometry of the inner tank surface, such as curved end walls, carries entrapped air bubbles or the like along the length of the upper flow passage 31a and into the lower flow passage 31b. Of course, the flow is continuous and the entrapped air allows oxygen therein to be dissolved within the sewage liquors and to be slowly depleted by the active organisms therein. As will be appreciated, each liquid flow segment in its travel through the various passageways away from one of the aeration means 34 contains less and less dissolved oxygen until it arrives at the next aeration means or returns to its initial starting point. Being low in dissolved oxygen, such circulating liquid segment more readily accepts oxygen from the air bubbles which are supplied at the aeration means and thus further increases the efficiency of the device.

The circulation is maintained for a period of time sufficient for at least a substantial portion of the raw sewage to be processed. Effluent leaves from the tank 31 by way of a suitable outlet means 37, which includes a weir 38 or dam means and a submerged conduit 38b having a control means 38a, which is automatically or manually activated. The effluent proceeds from the outlet means 37 to a final clarifier means (not shown) wherein sludge is removed for ultimate disposal and/or recycling for intermixture with fresh raw sewage. The remaining effluent is clarified and otherwise treated to yield useful water which can be discharged into streams or the like.

The outlet means 37 allows for a selective variance of the liquid depth within the tank. This variance allows the conservation of horsepower and further increases the efficiency of the overall device. As the flow of raw sewage decreases, the liquid depth within the tank can be decreased so that, for example, less surface area of the disks 36 is emerged within the liquid and less power is required to rotate the discs through such liquid. On the other hand, when heavy sewage flows are encountered, the liquid depth within the tank is increased and/or controlled by appropriate adjustments of the dam means 38 and conduit 38b so that more of the surface area of the disc is immersed and more oxygen is delivered to the sewage mixture.

As indicated, the confining tank 31 of the invention is of a generally rectangular shape having a liquid depth of approximately 8 to 12 feet. The ratio of length to depth can very from as little as 2:1 or 3:1 to 10:1 or even much greater ratios.

Another embodiment 40 of a confining tank 31 is illustrated at FIG. 4. As will be noted, the tank 31 is generally of a similar configuration to that explained in conjunction with embodiment 30, except that the surface aeration means 34b is comprised of a plurality of elliptically shaped discs 36' having a plurality of fine perforations 36'a therethrough. This geometry of the discs 36' allows them to carry air further beneath the surface of the liquid and thereby provides improved efficiency in certain areas of use. Additionally, embodiment 40 is provided with additional aeration means 34 within passageway 31b as a sub-surface aeration means 34b comprised of a pump means P provided with a pair of intake conduits 32a, one of which takes in air and the other which is connected to a return sludge (or recycled sewage liquors, etc.) addition means 13a. The air-return sludge mixture is passed through the pump means P and is injected into the circulating sewage liquor within the tank 31 through a plurality of open ended jet-sparge tubes or the like 42 at a predetermined velocity. It will be noted that the jet-sparge tubes 42 are positioned to inject air below the baffle-like member 33 and into the lower flow passageway 31b. The jet-sparge tubes 42 provide supplemental air to the sewage and also provide additional flow energy to insure that proper velocity is maintained within the circulating sewage to prevent any solids from settling out. In treatment tanks of relatively short lengths, the jet-sparge tubes primarily function to provide supplemental air and energy to the flowing liquid, while in tanks of relatively longer lengths, the jet-sparge tubes not only provide supplemental air and energy to that provided by the surface aeration means, but also supply an additionally equal amount of air and energy. As will be appreciated, in shorter length tanks, the dissolved oxygen span is from one aeration means 34 to another aeration means 34. In other words, a liquid flow segment is able to travel through at least a portion of a full flow circuit before the dissolved oxygen content of that flow segment is completely depleted. In certain embodiments, such as ones utilizing longer length holding tanks, the dissolved oxygen span is from the surface aeration means 34a to the sub-surface aeration means 34b and then back to the surface aeration means 34a.

A further embodiment 50 is illustrated at FIG. 5 and is quite similar to the embodiment 40 illustrated in FIG. 4 except that the surface aeration means 34a is comprised of cylindrical hollow perforated rolls 36" containing a plurality of perforations 36"a and a plurality of paddle-like members 36"b. The hollow rolls 36" function similarly to the perforated discs 36 and the paddle-like members 36"b impart flow or circulating energy to the confined sewage liquors. Additionally, the sub-surface aeration means 34b is positioned so that the jet-sparge tubes 42a (and it will be appreciated that plurality of such jet-sparge tubes may be utilized although only one are shown) is positioned at an angle so as to discharge air downwardly into the tank and along the flow path. This downward discharge insures that the air will have even a longer contact time with the liquid than would otherwise be possible; although additional horsepower is required to force air to the great depths.

The baffle-like member 33 not only insures that the air entrapped within the sewage liquors in the upper flow passageway 31a remains in the sewage throughout the substantial portion of the hydraulic flow circuit, but additionally, in such embodiments as 40 and 50, insures that the sub-surface aeration is effective. The air supplied by the sub-surface aeration means or jet-sparge means in such embodiments is thus positively entrapped by the baffle-like member and the air bubbles which would normally exit straight to the surface and no longer be usable for dissolved oxygen conversion purpose, are trapped below the surface so as to be so utilized. Further, the corrugated configuration of the baffle-like member 33 prevents the formation of large bubbles along the undersurface thereof and causes small bubbles to form throughout the entire body of sewage within the lower passageway. Of course, this means that considerably less air is initially required from the jet-sparge means as a greater percentage of the air which is supplied is available for dissolved oxygen conversion throughout the overall length of the tank.

An embodiment 60 of the apparatus constructed and operated in accordance with the principle of the invention is illustrated at FIG. 7. The tank 31 is generally similar to that previously described and is a generally rectangularly configured tank constructed of concrete or other suitable material and capable of containing a given volume of liquid. As indicated hereinbefore, the tank 31 may be of considerable depth and length, such as, for example, having a depth of about 60 to 90 feet and a length of about 100 to 200 feet. The interior of the tank 31 is divided into a plurality of flow passageways 31a, 31b, 31c and 31d by suitable baffle-like means 33 comprised of an outer baffle means 33a and an inner baffle means 33b. The flow passageways 31a through 31d are serially interconnected for fluid flow and guide liquid along one passageway and then along another passageway without allowing the liquids to intermix within the various passageways or allowing blind or dead spots to occur within such passageways. The tank is provided with a suitable fluid inlet passageway 32 that is suitably connected with a raw sewage supply 11a and a return sludge addition means 13a whereby the raw sewage and the return sludge are intermixed with each other as they enter the tank 31 so that mixed sewage liquor is circulated within the tank and through the various flow passageways described.

The baffle-like means 33 is mounted within the tank below the upper or normal liquid level so as to divide the interior of the tank into a plurality of approximately equal volume flow passageways. Generally, each passageway extends in depth to approximately 4 to 6 feet. The baffle-like means 33 is mounted along portions of the tank so that the sewage liquor can only flow around the ends thereof in a predetermined vertical orbital circuit so that each segment of sewage liquor passes through all of the flow passageways.

Aeration means 34 are mounted within at least one of the flow passageways described. As shown, surface aeration means 34a are mounted along the upper surface of tank 31 so as to come into contact with the sewage liquor flowing within flow passageway 31a. The aeration means 34, in the embodiment here shown, generally comprises a rotary brush device 36''' suitably mounted for rotation in the direction indicated. The individual brush member is composed of a suitable synthetic resin or the like and are merely bristles of sufficient rigidity to resist deflection within the liquid media and mounted along a suitable core in a sufficiently dense manner to entrap amounts of air therebetween and carry the same downwardly to contact the sewage liquor. As shown, when the brush devices 36''' rotate, they tend to pick up liquid droplets of the sewage liquor and carry it away from the body of such liquor and into the air for additional aeration. Depending upon the length of the tank 31, a plurality of surface aeration devices 34a can be provided along the length of flow passageway 31a. The brush-like devices 36''' thus provide a given amount of oxygen to the sewage liquor and provide a flow energy sufficient to establish directional flow and an adequate channel velocity necessary to maintain the waste solid within the liquor and prevent the same from settling out.

As the sewage liquors reach the end of flow passageway 31a they encounter the curved end walls 31' of the tank 31 and are forced downwardly into flow passageway 31b. An additional aeration means 34, here comprising a sub-surface aeration means 34b including a first jet-sparge device is positioned to discharge air and/or return sludge into passageway 31b. The sub-surface aeration means 34b provides additional air and flow energy to the sewage liquor. A valve V is provided to regulate the amount of air or air-return sludge mixture added at the jet-sparge means 42c. The sewage liquor continues to flow along passageway 31b in the directions indicated by the arrows until it reaches the far end thereof and encounters the curved end wall 33a' of the outer baffle-like member 34a, which causes it to flow downwardly and into flow passageway 31c. As will be appreciated, the plurality of jet-tube sparge tubes 42c can be provided as an array along the entrance of flow passageway 31b to provide adequate air and energy to the sewage liquor to insure that it continues to flow in the desired manner, i.e. without solids settling out and without depleting the oxygen content, throughout the passageways 31b and 31c. As the sewage liquors reach the end of flow passageway 31c they again encounter the curved end wall 31' of the tank 31 and are forced downwardly into flow passageway 31d. An additional array of jet-sparge tubes 42c' are provided along the entrance of flow passageway 31d so that additional air and energy can be imparted to the circulating sewage liquors to insure that solids do not settle out and that the air supply is not depleted within the sewage liquors. This circulating system is maintained for a period of time sufficient to treat at least a substantial portion of the initially supplied raw sewage and thereafter the outlet means 37 is activated so that a regulated amount of the treated sewage is removed as described hereinbefore.

As shown in the drawings, the sub-surface aeration means 34b comprises a pump P having a suitable air intake and a suitable return sludge intake and has a plurality of valve-regulated outlets interconnected to the jet-sparge tubes 42c and 42e' in a suitable manner so that selected amounts of air and/or return sludge can be added to the circulating sewage liquors. The embodiment 60 is particularly adapted for large volume installations.

In a modified method embodiment of the invention, such as shown at FIG. 7, a raw sewage supply 11, such as a city sewage line or the like, passes the raw sewage through a gross solid removal means 12, such as a settling tank, a comminuator, a bar-screen device, etc. wherein solids, such as grit, trash, sand, etc. are removed and/or reduced in particulate size so as not to interfere with the treatment of the sewage. It should be emphasized, that organic solids are only optionally removed and the instant invention contemplates interconnecting a plurality of the devices shown whereby solids and liquors can be effectively treated by passing the same through such systems. After the gross solid removal means 12, the raw sewage is mixed with return sludge at a return sludge addition means 13 and then the mixed sewage liquor is surface aerated by an aeration means 14 so that air bubbles and the like are introduced into the sewage liquors. The sewage-air mixture is then hydraulically circulated by means 15 through a vertically endless horbital flow pattern and then additional air and energy is provided by a sub-surface aeration means 15a. In this manner the sewage liquors are insured a sufficient amount of dissolved oxygen and flow energy for efficient treatment of sewage in a relatively confined area. After a suitably sufficient circulating time period, the treated sewage is removed and passed to a clarification means 16 wherein sludge is removed for recycling to the means 13 and/or disposal as desired, and the effluent is clarified and otherwise treated to yield useful water.

Thus, the invention provides a sewage treatment apparatus comprising a liquid confining means having an interior chamber capable of containing a given liquid level, a gas-impermeable baffle means positioned within the interior chamber below the normal liquid level so as to define a plurality of longitudinally extending flow passageways, means supplying sewage to the interior chamber, an aeration means positioned within one of the flow passageways for introducing air and flow-inducing energy to the sewage for circulating the air-sewage mixture through the plurality of flow passageways and a means for removing treated sewage.

The invention also provides, in a method of treating sewage, the combination comprising, confining raw sewage within a given area that includes a baffle means for dividing the area into upper and lower sewage portions, introducing at least return sludge and flow-inducing energy into the confined sewage, establishing a horizontally elongated endless vertical flow circuit about the baffle means so as to provide a complete mix of sewage matter within the confining area, introducing at least air within the lower sewage portion of the endless vertical flow circuit, positively maintaining and entrapping air within the sewage as it circulates within such lower portion for a period of time sufficient to treat a substantial portion of the sewage, and then removing the treated sewage from the confined area, as for clarification and treatment to yield useful water.

Modifications, variations and changes may be made to the above described preferred embodiments without departing from the spirit and scope of the novel concepts of the invention.

I claim as my invention:

1. A sewage treatment apparatus comprising:
   an elongated confining means having end walls and having an interior chamber capable of containing a given liquid level;
   horizontally disposed gas-impermeable baffle means substantially coextensive with said confining means and spaced from the end walls thereof to provide flow passages between said baffle means and end walls;
   said baffle means being positioned within said interior chamber below said liquid level;
   said confining means and baffle means defining a plurality of serially interconnecting passageways that establish an elongated endless vertical flow circuit for providing complete mix of sewage matter within said confining means;
   means applying raw sewage and return sludge to said interior chamber;
   an aeration means positioned in at least one of said passageways for introducing air and flow-inducing energy to sewage matter within said interior chamber; and
   means for removing treated sewage from said interior chamber.

2. A sewage treatment apparatus as defined in claim 1 wherein the liquid confining means comprises a concrete tank having a generally rectangular configuration with a ratio of length to depth of at least 2:1.

3. A sewage treatment apparatus as defined in claim 1 wherein the tank is provided with concavely curved end walls.

4. A sewage treatment apparatus as defined in claim 1 wherein the baffle means comprises a corrugated sheet of a synthetic resin material.

5. A sewage treatment apparatus as defined in claim 1 wherein the aeration means comprises a plurality of perforated discs mounted for rotation at least partially in contact with the sewage in one of said flow passageways.

6. A sewage treatment apparatus as defined in claim 1 wherein the aeration means comprises at least one perforated cylindrical roll mounted for rotation at least partially in contact with the sewage in one of said flow passageways.

7. A sewage treatment apparatus as defined in claim 1 wherein the aeration means comprises a jet-sparger means positioned within interior chamber below said baffle means.

8. A sewage treatment apparatus as defined in claim 7 wherein the jet-sparger means includes a pump means for intaking air and return sludge and a plurality of exhaust tubes operationally connected to said pump means for discharging air and return sludge within said sewage.

9. A sewage treatment apparatus as defined in claim 1 wherein the aeration means comprises a surface aeration means positioned in operating relation with the liquid level within the interior chamber and a sub-surface aeration means positioned in operating relation below said liquid level within the interior chamber.

10. In a method of treating sewage, the combination comprising:
confining raw sewage within a given confining area having a substantially greater length than depth, said confining area including a horizontally disposed baffle means that is substantially coextensive with said confining area and spaced from the ends thereof to provide flow passages between said baffle means and ends, said baffle means dividing said confining area into an upper sewage and a lower sewage portion;
introducing at least return sludge and flow-inducing energy into said raw sewage;
establishing a horizontally elongated endless vertical flow circuit about said baffle means substantially coextensive with the length of said confining area for providing a complete mix of sewage matter within said confining area;
introducing at least air within the lower sewage portion of said endless vertical flow circuit;
positively maintaining and entrapping said air within said sewage as it circulates within the lower portion of said flow circuit for a period of time sufficient to treat a substantial portion of said sewage; and
removing treated sewage matter from said confining area.

11. In a method of treating sewage as defined in claim 10 wherein an amount of air is introduced along the upper sewage portion of the confining area and a second amount of air is introduced along the lower sewage portion of the confining area.

References Cited

UNITED STATES PATENTS

| | | | |
|---|---|---|---|
| 3,575,849 | 4/1971 | Torpey | 210—14 |
| 1,343,797 | 6/1920 | Stott et al. | 210—14 |
| 1,936,305 | 11/1933 | Leffler | 261—123 |
| 3,480,144 | 11/1969 | Barth et al. | 210—4 |
| 3,371,033 | 2/1968 | Simmons et al. | 210—14 X |
| 3,428,555 | 2/1969 | Kitagawa et al. | 210—14 X |
| 2,058,785 | 10/1936 | Goudey et al. | 210—15 X |
| 2,433,884 | 1/1948 | Bevan | 210—151 X |
| 3,398,089 | 8/1968 | Mackrle et al. | 210—7 |

FOREIGN PATENTS 571,565 3/1933 Germany.

OTHER REFERENCES

Babbitt, H. E., Sewerage and Sewage Treatment, 6th ed., 1947, John Wiley & Sons, p. 454 relied on.

MICHAEL ROGERS, Primary Examiner

U.S. Cl. X.R.

210—14, 17, 150, 220; 261—123